Aug. 18, 1931.    M. FLEISCHER    1,819,883
METHOD AND MEANS FOR PRODUCING FILMS
Filed April 3, 1925    5 Sheets-Sheet 2

WITNESSES
E. A. Wilson
Harry E. Seidel.

INVENTOR
MAX FLEISCHER
BY
ATTORNEYS

Aug. 18, 1931.  M. FLEISCHER  1,819,883
METHOD AND MEANS FOR PRODUCING FILMS
Filed April 3, 1925  5 Sheets-Sheet 3
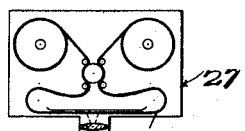
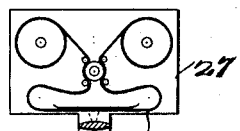
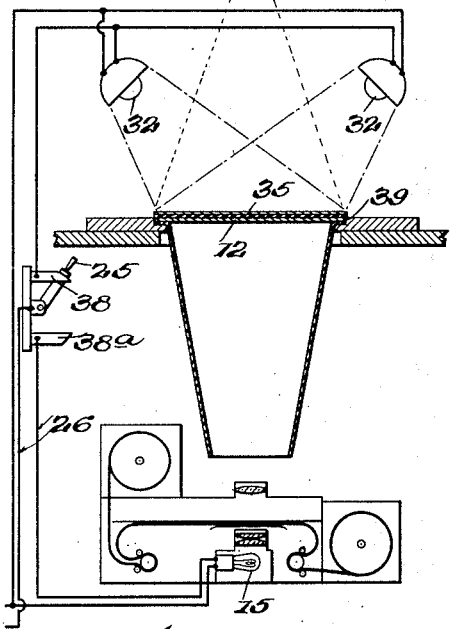
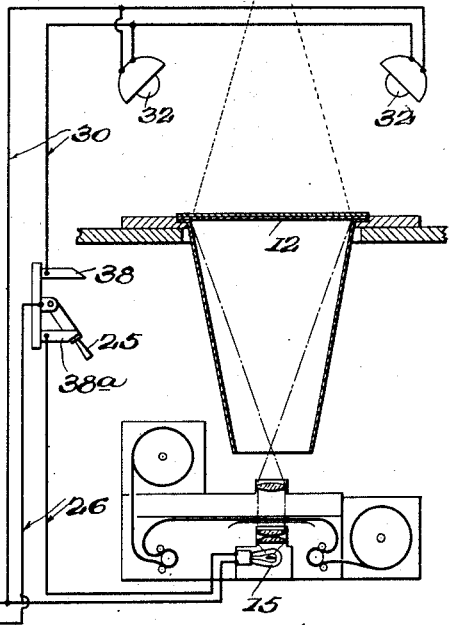
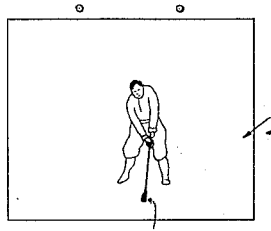
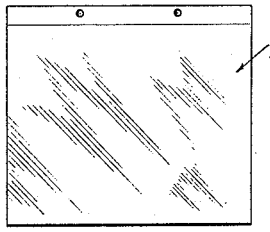
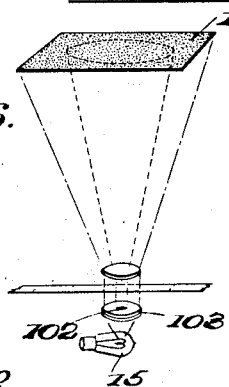
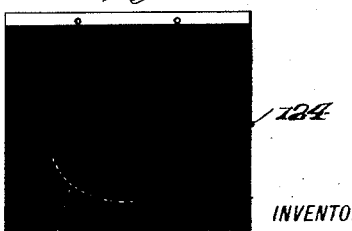
WITNESSES
E. A. Wilson
Harry E. Seidel
INVENTOR
MAX FLEISCHER
BY
ATTORNEYS Aug. 18, 1931.  M. FLEISCHER  1,819,883
METHOD AND MEANS FOR PRODUCING FILMS
Filed April 3, 1925   5 Sheets-Sheet 4
Fig.9.  Fig.10.  Fig.11.  Fig.12.
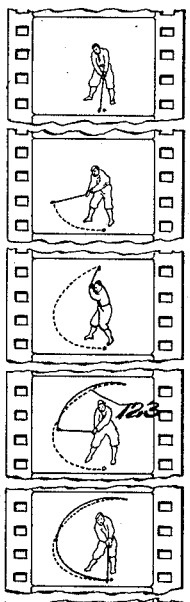
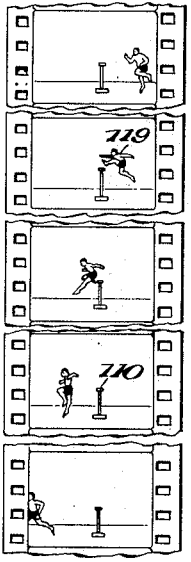
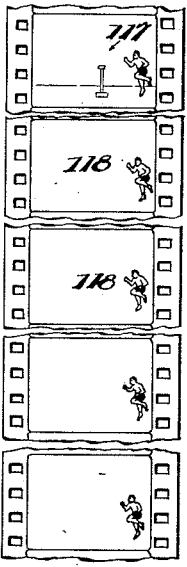
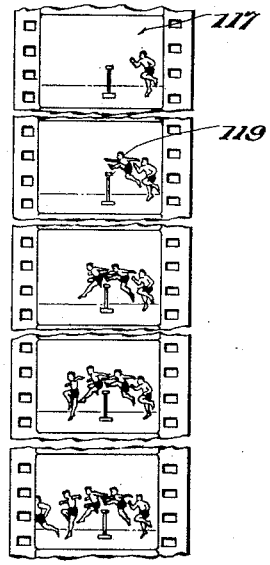
Fig.13.
Fig.15.
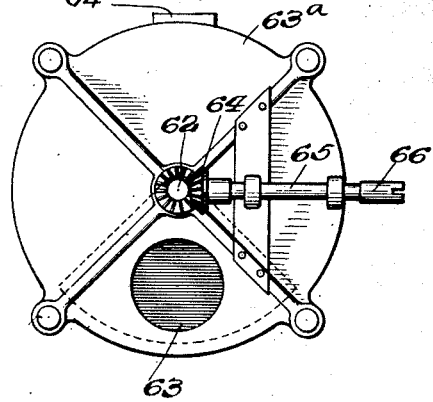
Fig.14.
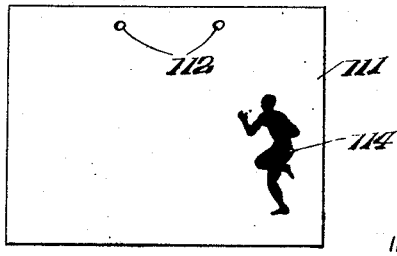
WITNESSES
E.A.Wilson
Harry E. Deidel
INVENTOR
MAX FLEISCHER
BY Munn & Co
ATTORNEYS Aug. 18, 1931.  M. FLEISCHER  1,819,883
METHOD AND MEANS FOR PRODUCING FILMS
Filed April 3, 1925   5 Sheets-Sheet 5
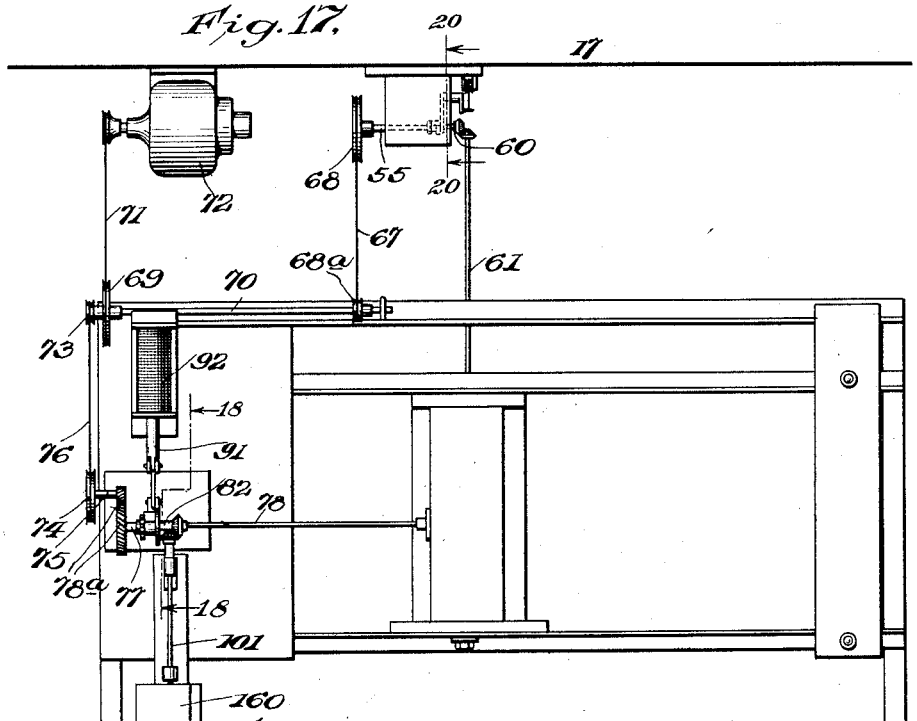
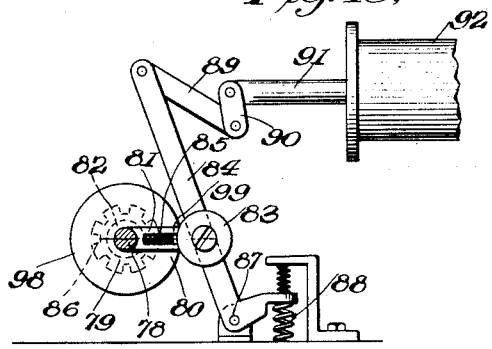
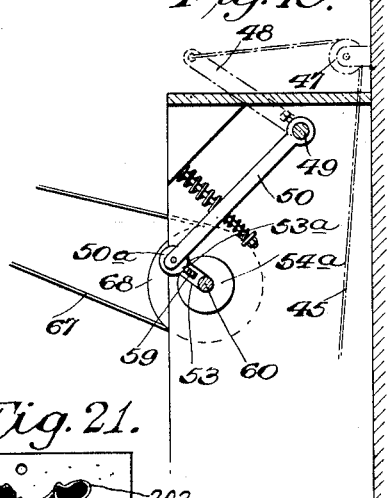
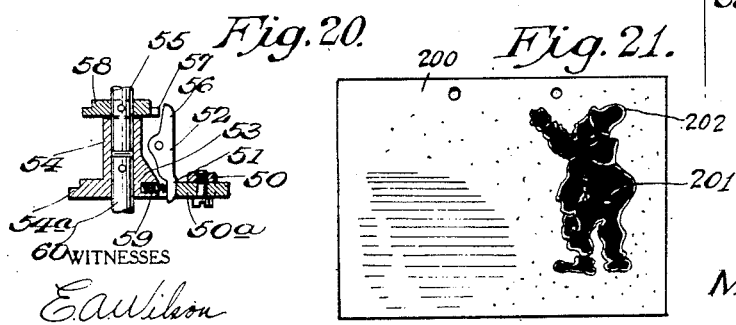
INVENTOR
MAX FLEISCHER
BY
ATTORNEYS Patented Aug. 18, 1931

1,819,883

UNITED STATES PATENT OFFICE

MAX FLEISCHER, OF BROOKLYN, NEW YORK, ASSIGNOR TO OUT OF THE INKWELL FILMS, INC., OF NEW YORK, N. Y., A CORPORATION OF NEW YORK

METHOD AND MEANS FOR PRODUCING FILMS

Application filed April 3, 1925. Serial No. 20,440.

This invention relates to a process and apparatus for producing novelties in pictures and has for its object the provision of a process for producing motion pictures on films or other media for projection in which a particular figure may be shown in action or in repose at any point on a background.

Another object of the invention is the provision of a process for producing motion pictures for projection in which a figure in action may be retained throughout a definite portion of a number of the frames, while simultaneously showing the consecutive movements of the figure.

A further object of the invention is the provision of a process for producing moving pictures in which a figure in action is supplied to a definite background which is also in action and so coordinated that the composite pictures will form one continuous medium for projection.

A still further object of the invention is the provision of a novel device for projecting a series of pictures on a translucent screen, a camera for photographing the projected pictures, and for photographing related subjects by reflected or transmitted light on a film carried by the camera.

Other objects include the provision of a device for photographing projected pictures and for photographing other pictures directly on the same film by reflected light, with means for operating the projecting apparatus at will and also for operating a shutter and an instrumentality for taking the photographs, with clutch mechanism controlling the driving of the film to be projected and the negative carried by the camera.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 3 shows more or less diagrammatically the electric circuits for the lights and the method of taking photographs by reflected light.

Figure 4 shows more or less diagrammatically the combined projector and camera in operative position for taking photographs by transmitted light.

Figure 5 shows a blank disclosing a projected figure of a golf player in a position for hitting a ball.

Figure 6 shows a transparent sheet adapted to be applied in position over the opening through which a photograph is projected for applying a series of dots to designate the continuous movement of the heel of a golf club.

Figure 7 is a transparent sheet upon which a section of the path of the heel of a golf club is designated by a series of dots.

Figure 8 shows a transparent sheet having an opaque surface or a sheet made of opaque material which is employed for photographing the curve by reflected light which indicates the path of the golf stick.

Figure 9 shows a section of a film which has been completed, by my new process for indicating the path described by the heel of a golf club.

Figure 10 shows a series of frames disclosing certain fixed positions of an acrobat.

Figure 11 shows a series of frames having the initial position fixed throughout the length of the film and discloses the first step in my improved process.

Figure 12 shows a film having a predetermined number of fixed poses of an athlete which are maintained throughout various lengths of the film.

Figure 13 shows a mask which is adapted to be placed over a projected picture to blot out all of the background, except a particular figure.

Figure 1:
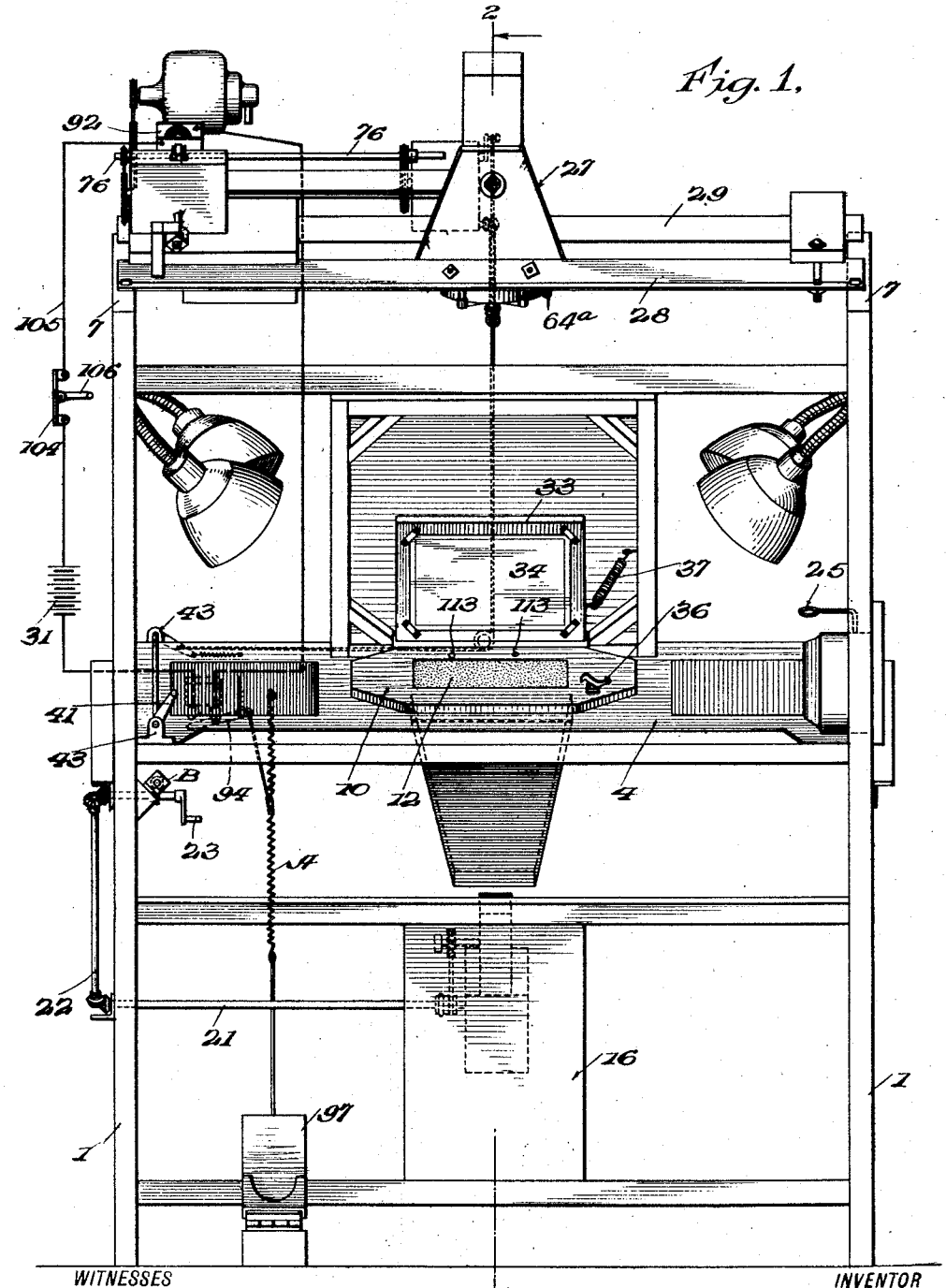
Figure 1 is a view in elevation of the assembled machine for taking composite moving pictures.

Figure 14 discloses a transparent member with the figure shown in Figure 13 as a silhouette for blotting out only the figure during photographing of the background.

Figure 15 shows a bottom plan view of the auxiliary shutter connected with the bottom of the camera.

Figure 16 shows diagrammatically the method of projecting a complete picture, including a background upon a translucent plate.

Figure 17 shows a plan view of the operating mechanism of the device.

Figure 18 is a fragmentary side view in elevation of the clutch and brake mechanism which controls the operating device of the photographic camera.

Figure 19 is a vertical section of the clutch mechanism for the camera shutter.

Figure 20 is an enlarged sectional view of the clutch mechanism shown in Figure 19.

Figure 21 shows a cartoon employed in connection with photographed scenes of objects.

Referring more particularly to the drawings, 1 designates a pair of front standards, while 2 and 3 respectively designate intermediate and rear inclined standards. A table 4 is supported intermediate the ends of the standards 2 and 3 and is inclined at an angle to the horizontal. Transverse brace bars 5, 6 and 7 are connected with the front and rear standards 1 and 3, the bars 6 and 7 being inclined at an angle to the horizontal.

The table 4 is provided with a central opening 8 through which is inserted a hood 9, the hood being supported from a plate 10 which is removably connected to the table 4 by means of bolts 11. The plate 10 has an opening in alinement with the opening 8 of the table 4 and is closed by a translucent plate or screen 12, the upper surface of the transulcent member being flush with the surface of the plate 10. A more complete description of the screen or plate 12 will be presently given.

Figure 2:
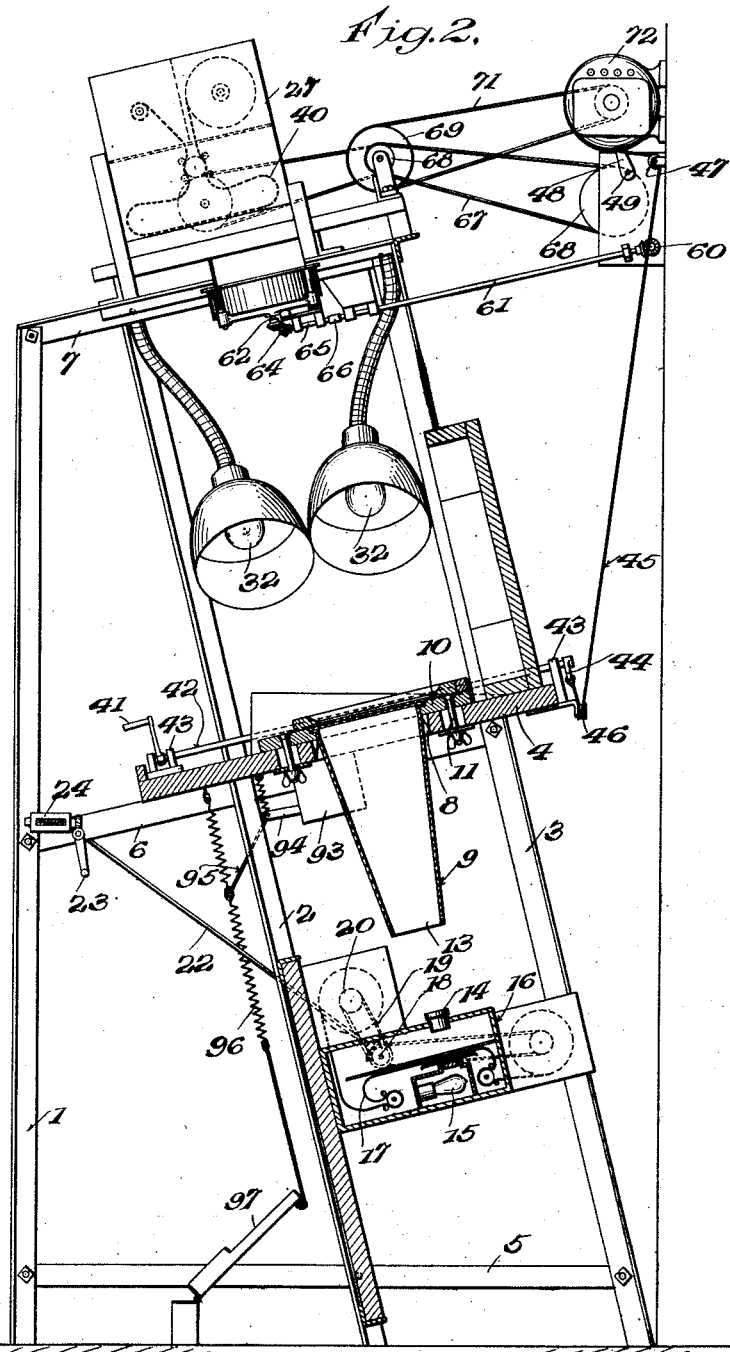
Figure 2 is a transverse vertical section taken along the line 2—2 of Figure 1.

Below the open end 13 of the hood 9 is located a lens 14 for the purpose of projecting the light rays from the lamp 15 of the projection camera 16 which are first passed through the frames of a moving film 17 carried in the usual manner by a plurality of rollers and driven by a shaft 18 through a belt 19 and a pulley 20. This shaft is driven by shafts 21 and 22, suitable gearing and a crank 23. This crank is mounted as shown more particularly in Figure 2 on the brace bar 6 at one side of the frame. The crank is adapted to shift a frame into position for projecting a picture on the translucent member 12 by one complete revolution of the crank. A registering device 24, operated by the crank 23, is adapted to indicate the number of frames that have been consecutively projected upon the translucent member 12.

In other words when the switch lever 25 is moved to a predetermined position for closing the circuit 26 to the lamp 15 a photographic reproduction of the positive frame of the film 17 is displayed upon the translucent member or screen 12 and is ready to be photographed by a camera generally designated by the numeral 27 mounted upon bars 28 and 29 carried by the upper end of the transverse bars 7.

A second circuit 30 usually connected with a house current indicated by the electrical source shown at 31 is adapted to illuminate lamps 32 mounted in pairs at the inner sides of the end frames for projecting light rays upon a picture or cartoon 35 superimposed upon screen 12. A movable platen or frame 33 has a transparent member 34 and is adapted when desired to retain a picture 35 to be photographed on screen 12. A catch 36 locks the platen in lowered and operative position and a spring 37 is adapted to return the platen to an inoperative vertical position.

The switch lever 25 when moved to the contact 38 is adapted to close the circuit 30 for lighting the lamps 32 and when moved to contact 38a closes the circuit 26 for lighting lamp 15, or when moved to an intermediate or neutral position all the lamps 15 and 32 are then unlighted.

An opaque member 39 is located below the picture 35 when the same has a transparent background to prevent light rays from the lamp 15 passing through the transparency and affecting the negative 40 except in parts not exposed by the transparency, the negative being intermittently moved in the usual manner in the camera 27 when the picture is registered on said negative by reflected light.

A shutter 63 to be presently described is rotated at will by a device which is controlled through a crank 41. This crank is secured to the end of a shaft 42 mounted in bearings 43 on the table 4 and carries a lever 44 to which is connected one end of a cable 45 entrained over a pulley 46 carried by a bracket on the rear end of the table. The cable is extended upwardly and entrained over a pulley 47 and then connected to a lever 48. This lever operates a shaft 49 and a spring pressed lever 50 secured to said shaft and provided with a roller 50a which acts as a brake for engaging a projection 51 on the end of a spring pressed operating lever 52 pivoted in a slot of a revolving block 53 carried by a sleeve 54 loosely receiving one end of shaft 55. This pawl lever has an end 56 projecting beyond the block 53 and adapted to be seated within a notch 57 of a clutch member 58 pinned to the shaft 55. A spring 59 forces the pawl 56 into the notch 57 when the brake 50a has been moved out of engagement with the end of said pawl. One end of a driven shaft 60 is inserted in the sleeve 54 and keyed thereto so that when the pawl 56 engages the notch 57 of clutch member 58, the sleeve will be revolved and drive shaft 60.

Integrally formed with sleeve 54 is a disk 54a upon the periphery of which rides the brake disc 50a when the sleeve is revolved. The disc 54a has a notch 53a in radial alinement with the block 53 in which the brake 50a seats to depress the outer end of the pawl 52.

The shaft 60, through suitable gearing and a second driven shaft 61, is adapted to operate a shaft 62 connected with the shutter 63 mounted in a casing 63a pivoted to the bottom of the camera 27. Suitable gearing 64 and shaft 65 are operatively connected with shaft 61 by sliding a sleeve 66 in a predetermined direction. Shafts 61 and 65 are disconnected so that the casing 63a may be swung upon a hinged mounting when desired. The shaft 55 is driven through a pulley 68, a belt 67, pulleys 68a and 69 on a shaft 70 and by a belt 71, which, in turn is driven by a motor 72. A pulley 73 and shaft 70 drive the pulley 74 and a shaft 75 through a belt 76. The shaft 77 through suitable gearing 78a is driven by shaft 75 and in turn is adapted to revolve a shaft 78 when a clutch mechanism is operated for connecting shafts 77 to 78.

This clutch mechanism is similar to the clutch mechanism shown in Figures 19 and 20 and includes a wheel 79 having notches adapted to be engaged by a spring pressed pawl 80 pivoted in a slot in a block 81 which has a sleeve 82 keyed to the shaft 78. The clutch member 79 is keyed to shaft 77 which has an end projecting into the sleeve 82 of the block 81. A brake disc 83 mounted upon a lever 84 is adapted to engage the outer end of the pawl 80 and force the same against the tension of the spring 85 outwardly from one of the notches 86 of the clutch member 79. The lever 84 is pivoted at 87 on the frame and is spring-pressed as shown at 88 to maintain the brake 83 at a normal operative position for maintaining the pawl 80 out of engagement with the notch 86 of the clutch member 79. The upper end of the lever is connected by means of links 89 and 90 to an armature 91 controlled by a solenoid 92. This solenoid is in circuit with the motor and can only be actuated when the motor switch is moved to an operative position for closing the circuit to the motor.

A switch box 93 is secured to the under face of the table 4 and has a switch arm 94 connected by links 95 and spring 96 to a foot pedal 97. When the foot pedal 97 is depressed the switch is operated to close the circuit to the solenoid whereby the armature is moved inwardly of the same and the lever 84 is moved outwardly from the clutch member 79 and the brake 83 is removed from its engagement with the pawl 80 thereby releasing the pawl to the action of the spring 85 which forces the outer free end of the pawl into engagement with a notch 86 of the clutch member 79 whereby shaft 77 is locked to shaft 78 for simultaneous rotation. It must be borne in mind that normally the action of the foot pedal 97 is instantaneous for closing and opening the circuit so that when the current is cut off from the solenoid the spring pressed member 88 forces the lever 84 toward the clutch member 79 whence the brake 83 will ride upon the periphery of an enlarged disc 98 until the portion of said disc which carries the pawl 80 again comes in contact with the roller 83 whence the roller will drop into a notch 99 at this point to permit the brake 83 to force the pawl 80 downwardly at one end, while the opposite end is forced out of engagement with the notch of the clutch member 79.

At each depression of the foot pedal 97 the solenoid will release the clutch and lock shafts 77 and 78 together so that the camera 27 will be instantaneously actuated to advance or reverse the film at will, while shutter 63 remains unmoved in its closed position.

A registering device 160 is driven by a shaft 101 and is adapted to keep a record of the number of raw stock frames which have passed through the camera while the registering device 24 is adapted to keep a record of the number of finished frames which have been used for projecting a positive on screen 12.

The translucent plate 12 has a ground outer surface, while its inner surface is covered by a negative film the film being exposed to a dull light and then developed. The center of the film has a greater thickness than any other portion, the thickness being greatly reduced toward the periphery. The object of such a construction is to prevent the central concentration of the light on the projected picture and thereby causing an over-exposure at this point, thus producing a picture having its surface unevenly exposed. By applying an opaque circular spot 102 to the condenser lens 103 of the projecting camera 16 a substantially similar result is had so that it is only necessary to employ a plate of glass having its outer face ground.

The switch base 104 as shown in the circuit 105 of the motor has an operating lever 106 which when moved in one direction will cause the motor to drive the shaft in a normal forward movement but when the switch is moved in the opposite direction the direction of rotation of the motor is reversed.

A number of related methods for producing projection films may be carried out on the apparatus such as:—

Method 1

Recording an initial pose and various successive poses of a figure selected at intervals in predetermined positions on a number of frames of a film while recording a moving background and intermediate poses between the successive fixed poses so that the projection will disclose the initial pose as fixed throughout the series of frames and the other selected poses as fixed progressively from their initial appearance in the series, with the figure apparently stepping out of itself from each fixed pose, completing a series of acts and then merging into the succeeding fixed pose.

This process is especially adapted for recording the analysis of a figure or object in motion, such as an acrobatic feat disclosing a runner, a diver, etc.

In carrying out such a process a reel of positive frames is made of a person jumping over a pedestal 110 as shown in Figure 10. This film is placed in the projecting camera 16 and lamp 15 lighted by operating the proper switch. The projection of the first frame containing the initial pose appears on the screen 12 after the crank 23 has been operated, while the registering device 24 discloses the number of frames that have passed before the projection lens 14, complete registration being had for each frame when the crank is in the lowered position shown in Figure 2.

A transparent sheet 111 having perforations 112 is placed upon the screen 12 with pins 113 mounted on the plate 10 registering with said perforations whereby the sheet is retained in a definite position with respect to the various elements forming the projected scene.

A silhouette 114 of the initial pose of the athlete or moving figure is then drawn on the sheet 111. A second transparent sheet is then placed in position and held by the pins 113 and perforations 112. This initial pose is outlined and a mask 115 is formed by covering the entire transparent sheet, except the figure, with ink, preferably black or an opaque red. The sheet 111 is removed, permitting the projected figure to appear through the opening 116 of the mask 115.

The switch to the motor is closed after a negative film is placed in operative position in the camera 27. Crank 41 is moved to the right in Figure 1 and maintained in this position while shutter 63 revolves, permitting the projected picture exposed on plate 12 to be photographed on film 40 in camera 27, then the treadle 97 is depressed, closing switch 94 and placing the solenoid 92 in circuit which releases the brake 83 permitting the member 79 to revolve since pawl 80 locks the shafts 77 and 78 for simultaneous rotation. Retaining crank 41 in lowered position causes the brake 50a to release pawl 56 which locks wheel 57 to sleeve 54 whereby shafts 55 and 60 are simultaneously rotated and shutter 63 is actuated in timed relation with the movement of the raw stock frames of the film 40 in the camera 27. When the shaft 78 is revolved the mechanism in camera 27 is set in motion for consecutively placing the frames in photographing position before the usual opening in the bottom of the camera 27. The operation of shaft 78 has no connection with, and is independent, of shutter 63.

Since the projection on the screen 12 is covered but for the opening 116 a series of negatives of the figure in its initial pose is produced on all the raw stock frames of the complete reel or negative 40 as shown in Figure 11.

The switch 106 is reversed when the motor rotates in the opposite direction and the treadle is again depressed permitting the operating mechanism of the camera to rewind the film 40 to its initial photographic position. During the rewinding it is not necessary to suppress the lamp 15 or place an opaque covering in superimposed position on the opening 116 to prevent double exposure since the shutter 63 remains closed, because said shutter is independent of the action of camera 27 or film 40.

It must be borne in mind that all the frames of the projection film disclosing the positions of the figure before the initial position is reached, may or may not be employed in the finished reel, i. e., they are removed from said film and secured in the usual manner to the reel which is being produced by this process in advance of the frames showing the initial pose.

If desired negatives may be made of such poses and the background directly on the raw stock frames of the film 40 in advance of the initial pose and the number of frames of projection before the initial position is reached is noted on the registering device 24 for determining the appearance of the initial pose of the projected reel. Furthermore the usual repeats are made of the initial pose and background of the projection shown on frame 117 of Figure 11 before the mask 115 is applied to produce the full series of negatives of the initial fixed pose disclosed by frames 118.

After the initial pose without anything more has been registered on all the raw stock frames in camera 27 except those frames which were used for the preliminary scenes leading to and including the starting position, the mask 115 is removed and sheet 111 positioned on the screen 12 by pins 113. The silhouette 114 is now shielding the initial pose from the film in the camera 27.

Crank 23 is revolved whence a succeeding frame is projected upon the screne 12 disclosing a pose of the figure slightly in advance of the initial pose but in arrears of the second fixed pose 119 shown in Figures 10 and 12. This projected frame is registered on the frame of the negative 40 which is in advance of the raw stock frames registering frame 117 by operating successively the treadle 97 and crank 41. A sufficient number of repeats of each position is made as is required in cinematography. Successive frames disclosing advancing stages of the figure from the initial fixed pose are projected by crank 23 and progressively photographed with the silhouette 114 masking always the initial position until the second fixed pose 119 is reached. A series of repeats of this fixed pose and background is registered on a sufficient number of the raw stock frames by the operation of treadle 97 and crank 41 as will be required.

A silhouette of the second fixed pose is added to silhouette 114 of sheet 111. A mask similar to mask 116 is provided as before to cover the projected frames except the second fixed pose. The mask is applied to screen 12 and camera 27 is operated to register negatives on the remaining raw stock frames of the sole second fixed pose.

At the completion of this operation the motor is reversed and the negative is returned to the point where the first negative of the single fixed second pose of the figure was registered on the film 40. The transparency 111 containing the two silhouettes is placed on the screen 12 after the removal of the mask. Successive frames of the film 17 are projected on the screen and progressively photographed on the film 40 until the third fixed pose is reached and a sufficient number of the photographs of this projected frame is made, with the first and second fixed poses masked. A third silhouette is then added to sheet 111 and a mask is provided to blot out all the background except the third pose of the figure. The method of photographing this sole fixed pose and the other succeeding fixed poses is then carried out as before while supplying the intervening poses and backgrounds as has been described. The negative is then developed and projection films are subsequently made as is well known.

A reel is thus produced in which certain fixed poses are disclosed as continuing throughout a length of the film, from the several initial positions of the figure which it assumes in the completion of a series of acts.

Method II

This method shown in Figure 9 parallels in certain respects Method I and is intended to record for analysis the path of moving objects such as the heel of a golf club, a weight carried at the end of a chain and conveyed through a series of curved paths in preparation of being hurled by an athlete, and such other like objects in motion.

This method permanently records the action on the film by application of lines or marks of any kind to illustrate the course of action, as for instance, a dotted line may be recorded consecutively on the film to disclose the upward movement of the heel of a golf club and a solid line recorded to define the downward movement, the solid line differentiating to a nicety from the dotted line so that the two paths are shown in marked contrast.

A projection is first provided in the usual manner of a golfer progressively completing a stroke. The film is then placed in the projecting camera 16 and a frame showing the initial position of the upstroke is projected on screen 12. A sufficient number of photographs of this position is registered on the film 40 by actuating alternately and in succession treadle 97 and crank 41. It is understood that the shutter of camera 27 is closed. A transparent sheet 120 is then placed on screen 12 and an opaque spot or dot is placed on the said sheet where the heel 121 of the club touches the ball 122. The crank 23 is operated to project all the frames of the positive in the camera 16 on the screen. Each increment of the consecutive positions of the heel of the club during the up stroke are registered on the sheet 120 by a series of opaque black dots delineating the curved path 123 of the club. A second sheet 124 is placed on sheet 120 and the surface is covered with an opaque ink except the dots forming the curved path. A third transparent sheet 125 is then employed and the first dot 126 (Figure 5) is placed on the sheet registering with the initial dot on sheet 120, or the dots themselves may act as their own masks. Images are indicated in Figs. 5 and 7 to disclose the position of the golfer relative to the dots.

The crank 23 is then reversed continuously until the film 17 is rewound and the frame showing the first of the series of initial positions of the golfer is reached. This frame is moved out of position and the next successive position frame which has not been photographed is projected on screen 12. Sheet 124 is placed on the screen 12 with a white sheet of paper beneath the openings 127. A black opaque sheet is employed to cover all the openings except the first representing the initial position of the heel of the club. This white spot appearing through the opening in the opaque sheet is then photographed successively by reflected light from lamps 32 on all the raw stock frames except those frames registering the preliminary positions. Sheet 124 with its accessories is removed and sheet 125 with its single dot 126 is placed in position on screen 12 whereby the background appears with the dot masked. Successive negatives approximately 16 in number are produced of this partially masked background on the raw stock frames of film 40 which carries the photographs of the white dot from sheet 124.

On the next series of successive raw stock frames are photographically registered the next white dot of sheet 124 by reflected light, the dot already photographed being covered with opaque material. A second opaque dot is placed on sheet 125. Sheet 124 is removed and sheet 125 is placed on screen 12 and when crank 23 is operated the successive incremental position or pose of the golfer and his club is projected on screen 12 and then photographed after lamps 32 have been suppressed. Each of the other white spots on sheet 124 are progressively photographed with the series of preceding dots. The backgrounds corresponding to the position of the heel of the golf club are also registered on negative 40 while the negatives of the white spots are protected or masked during photographing of the backgrounds. In the complete series of frames of the raw stock in camera 27 the initial dot 126 is registered. The succeeding dots are registered throughout a series of raw stock frames from their initial appearances which are dependent upon the relative positions of the club in the series of positive frames of the projection film 17.

It must be appreciated that such a dotted path will appear on the positive film as white but the path may be made to appear in black dots by the elimination of sheet 124, in which case the dots act as their own masks.

The return stroke of the heel of the club is recorded in a continuing white curve instead of the dots and the method of production is similar.

The path is traced on an opaque black sheet such as 124 and by means of a sharp knife the path is then removed providing an opening corresponding to said path, or the path may be drawn on black paper with white dots. A transparent sheet may be employed on which is placed progressively continuing sections of the path in opaque ink with the advance section merging into a preceding section. The remaining frames of film 17 are projected on screen 12 and the opaque sheet having the opening representing the path is placed on said screen. The path or opening is partially covered permitting the first section of the path of the down stroke to appear, an opaque white sheet being placed below the opaque black sheet. This section of the path is then registered on the negative 40 by reflected light. The black sheet or mask and opaque white sheet are removed and the transparent sheet positioned on screen 12 having the first section of the track described thereon in opaque ink and appearing as following the heel of the club. The background is then registered on film 40 with the portion of the path masked. Succeeding frames are projected on screen 12 with the corresponding sections of the track added to the transparent sheet for masking the continuing track, and photographed after photographic registrations have been made of continuing sections of the track on the negative by progressively uncovering successive sections of the opening in the opaque black mask until the complete track of the return stroke of the heel of the club has been recorded on said negative. The corresponding backgrounds are also registered.

In the finished product such as a positive for projection, a golfer will be disclosed swinging his club with a white line showing the path described by the heel of the club and following said heel throughout the down stroke, while a series of white dots will follow the heel upon the up stroke of the club, leaving a permanent path as recorded by the heel and trailing in arrears of said heel.

*Method III*

This method coordinates a cartoon or mechanical drawing in line or wash or both in synchronism with a moving background.

The entire scene adapted for use in such a relation is first photographed and a projection film is made for camera 16. The frames are successively projected on screen 12 and for each position of the figure of the cartoon relative to the cooperating elements of the entire scenes of each frame of the projection a pose or cartoon is sketched on a transparent sheet 200.

These sketches are made in opaque ink as a silhouette with white lines 202 on the silhouette 201 disclosing the character of the figure. After the completion of the cartoon on the silhouettes shown in Figure 21, the projection film is rewound and the initial background is again projected on screen 12. The initial background represents any one of the series of photographs or frames of the scenes mentioned above as being first photographed. A black opaque pad is placed on said screen to suppress any illumination from the projection and the transparency containing the cartoon showing the initial pose of the figure is placed on the pad and photographed on a certain number of the frames of the negative in camera 27 by reflected light from lamps 32. Approximately sixteen frames of the negative are employed for registering the first position of the cartoon. Switch 25 controls the lighting of said lamps. The pad is removed and the background is photographed by transmitted light with the silhouette masking the cartoon and preventing a double exposure. The cartoon at this time is not illuminated. In other words, without the mask, that portion of the background which must be replaced by the mask would be registered on the negative of the cartoon.

The next frame is projected on screen 12 and the cartoon corresponding to such frame is placed on said screen after the removal of the first cartoon. The opaque pad is inserted between the screen and the cartoon. The cartoon is photographed by reflected light and after the removal of the pad, the background is registered on the same raw stock frame in camera 27 with the opaque cartoon acting as a mask to prevent double exposure. The cartoon at this time is not illuminated. The successive photographing by reflected light of each of the other cartoons of the series, and the successive photographing by transmitted light of the complementary backgrounds intermingled with the masking cartoons, is continued until the complete scene or scenes are registered in sequence on the negative film in camera 27. The negative is developed and the usual process is carried out for the production of the projection film as is well known.

The result of such a method provides a background for each cartoon cooperating with said cartoon to produce a harmonious effect so that the figure depicted by the cartoon moves relative to the background or an element or certain elements of the background while such elements may move relative to the cartoon and to fixed objects or elements of said background. The limitation element where used throughout the specification defines any moving inanimate object or animate being included in the projection and forming a constituent of the background.

Method IV

Another method capable of being carried out on the apparatus described is one in which all or any portion of a movable element of a background is completely suspended. Where only a portion is suspended the remaining movable elements are maintained in action. An example is as follows:—

A group of dancers or the like are shown in action completing certain steps and assuming prearranged poses. Definite poses of a dancer or several dancers may be retained at will and for definite periods of projection while the remaining dancers or all the dancers are shown in motion performing various steps.

Such a film is produced by preparing a positive for projection in the usual manner of a performance of the dancers. The film is placed in camera 16 and the frames projected on screen 12. A scene is selected. Masks and silhouettes are prepared for poses of certain of the dancers. The masks are employed for blotting out the background and the poses are photographed. The backgrounds are then photographed on the same series of raw stock frames in camera 27 with the poses masked by the silhouettes. In this connection, a sufficient number of negatives may be registered of the poses leading to the fixed poses for the production of the so-called "slow" motion pictures. Again the positive frames may be reversed from the fixed pose to the initial appearance of the dancer and consecutively registered on the negative in camera 27 so that the projection when finished will disclose the dancers performing a series of steps to a fixed pose, retaining such pose, and then retracing such steps to their initial appearance.

A continuation of the projection will show certain dancers in a suspended pose or poses while these dancers themselves may perform solely or in connection with other dancers.

Method V

This method relates to an accelerated or retarded action and is provided for by producing a motion picture of scenes having movable elements for projection. The positive film is placed in camera 16 and a frame is projected on screen 12. In order to retard the picture, each frame is registered a sufficient number of times on the negative in camera 27. The number of negatives of each frame made is greater than is necessary for the normal use in motion pictures so that when a positive is provided from such a negative the projection will show a slow motion picture.

In order to accelerate the motion certain of the frames of the projection in camera 16 are eliminated from registration on the negative in camera 27. The result is that a figure in action will be speeded up in performing its acts.

Method VI

In this method one or more motion pictures are combined in one scene and so merged that the points or lines of connection are not revealed. An example is shown in the following:—

Motion pictures are made of athletes in a race. The positive film is placed in camera 16 and a certain number of the frames are projected on screen 12. These frames, about sixteen in number, are registered on the negative in camera 27. The next frame or the seventeenth is projected on screen 12 and the lower half of the projection which disclosed the legs of the athletes is masked. The exposed portion is registered on the negative in camera 27. The succeeding frame of camera 16 is projected on screen 12 and the upper half is masked and the lower half registered on the same negative containing the registration of the upper half of the preceding frame by the operation of shutter 63. The upper half of the last frame is registered on a succeeding negative in camera 27. The lower half of the next frame is registered on this same negative. The combining of the registration of the upper halves of the other frames with the lower halves of advanced frames is continued at will. Whole frames are then photographed. Photographs are now registered on the negatives in camera 27 of succeeding frames disclosing the lower portions of the frames, the upper portions of advanced frames are registered on corresponding negatives in camera 27.

The result will disclose, when the positive made from such a negative is projected, the legs of the athletes moving in advance of the bodies, the bodies and legs in normal relation and then the bodies moving in advance of the legs.

Instead of the dots or increments of a curved line the golf heel may be employed for replacing such dots or lines and as such the method of reproduction will be identical with the first method of describing the path of the athlete jumping over the post.

The limitation "film" as employed in the specification and claims is intended to be interpreted as meaning any medium upon which motion pictures may be made, such for instance as paper, celluloid, and etc.

Obviously the claims contained herein set forth certain demonstration as to the various effects obtainable by this new process. Various combinations and effects will readily suggest themselves to those skilled in the art, and such suggestions will naturally follow as a result of the use of the apparatus and processes described and claimed herein.

What I claim is:

1. The method of producing a composite negative for cinematography which comprises forming a projection film of a background having moving elements, projecting the first frame of said film on a screen, masking the projected frame except that portion defining the initial pose of an element disclosed as being in action, successively photographing said element on a complete series of raw stock frames, projecting on said screen a series of successive frames of the projection film disclosing poses of the element advanced by increments, masking the action portion of each frame of the projection film by a silhouette defining the initial pose of said element, photographing the frames as they are projected in succession on a number of the raw stock frames on which the photographs of the initial pose were registered, projecting on the screen another frame disclosing the element in a pose remote from the initial pose, masking the projected frame except that portion defining the element in the advanced pose, photographing the unmasked element on the remainder of the raw stock frames on which are registered photographically the initial pose of the element in action, then masking said element in such advanced pose and also in the initial pose, projecting succeeding frames on the screen and consecutively photographing the projected frames thus masked on the same negatives on which are photographically registered the initial and advanced poses of the element.

2. The method of producing a composite negative for cinematography which comprises providing a projection film having finished frames of a background disclosing a movable element in a series of consecutive poses, selecting predetermined poses of the element disclosed by the finished frames, masking the background except the initial pose registering photographically the initially selected pose on all the raw stock frames of a negative film, registering photographically each of the other selected poses on all the remaining raw stock frames which correspond in sequence to the initial appearance of the poses as disclosed by the finished frames, and registering photographically the series of finished frames which are intermediate the selected poses on the raw stock frames which correspond in sequence to the series of finished frames, while masking the selected poses.

3. The method of producing negatives for cinematography which comprises forming a projection film containing a plurality of frames and disclosing a series of pictures of a background involving moving elements in different poses, projecting frames of the projection film on a screen, masking the background as projected on the screen except the selected poses of the moving element, photographing selected poses on a sufficient number of raw stock frames of a negative for retaining a selected pose in suspended position, masking the selected poses and photographing other frames in succession disclosing the sequence of the frames of the projection films.

4. A device for producing composite negatives for use in cinematography comprising a frame supporting a projection screen, a projection camera below the screen, a photographic camera above the screen, a lighting means independent of the projection camera for illuminating the screen by reflected light, means for moving frames of a projection film at will in the projection camera, means for moving raw stock frames of a negative film at will in the photographic camera, and means for causing the lighting means to be illuminated alternately with the projection camera.

5. A device for producing composite negatives for use in cinematography comprising a frame supporting a projection screen, a projection camera below the screen, a photographic camera above the screen, a lighting means independent of the projection camera for illuminating the screen by reflected light, means for moving frames of a projection film at will in the projection camera, means for moving raw stock frames of a negative film at will in the photographic camera, a shutter for controlling the exposures of the negative frames, and means controllable at will for actuating the shutter, and means for causing the lighting means to be illuminated alternately with the projection camera.

6. In a device for producing composite negatives for use in cinematography, a photographic camera having a light opening, a casing hinged on said camera and embracing said opening in the camera, said casing having an opening alining with the opening in said camera, a shutter mounted in said casing for closing the opening in said casing, means on the casing for actuating said shutter including a driven shaft projecting from the shutter, a driving shaft, and means for connecting the driving shaft with the shaft on the casing.

7. In a device for producing composite negatives for use in cinematography, a photographic camera having a light opening, a casing hinged on said camera and embracing said opening in the camera, said casing having an opening alining with the opening in said camera, and a shutter mounted in said casing for closing the opening in said casing, means for causing movement of the film in the camera, and means operated independently of the film moving means for actuating the shutter.

8. The method of producing negatives for cinematography which comprises forming a projection film having a plurality of frames disclosing a series of pictures of a background involving moving elements in different poses, projecting the initial frame of the projection film on a screen, the frame containing an initial pose of the moving element, masking the background except the initial pose of the moving element, photographing the object in such initial pose on a number of raw stock frames of the negative, projecting other frames of the films on the screen, the last mentioned frames containing selected poses which show an advance of the moving element masking the background except the selected poses and photographing each selected pose on as many of the raw stock frames that correspond to the number of the frames of the projection film which discloses a moving element from such advanced position, then projecting the frames in succession on the screen while masking the initially selected poses and photographing the remaining portions of the background on the raw stock frames of the negative in the sequence in which the background is displayed on the screen.

9. The method of producing negatives for cinematography which comprises forming a projection film disclosing a series of pictures of a background involving moving elements in different poses, projecting a frame of the film on a screen, masking selected poses of the moving object disclosed by the projected frames, photographing the projected frames, then masking the background except the selected poses, photographing the selected poses on as many raw stock frames of the negative in a sequence as the selected poses initially appear on the projected frames for retaining selected poses in suspended positions.

10. A method of producing a composite negative for cinematography which comprises a projection film of a background involving moving elements, projecting an initial frame of said film on a screen, applying a transparent sheet to the screen, manually producing a mark on the transparent sheet capable of being photographed, photographing by reflected light the mark on all of the raw stock frames of the negative, photographing the frames of the projection film which correspond to the position of the moving object as represented by the mark, projecting other frames of the projection film in succession on the screen, applying marks consecutively on transparent sheets to designate the continuing path of the elements and photographing the marks applied in succession by transmitted light while photographing by the transmitted light the background corresponding to the continuing path of the elements on the raw stock frames of the negative.

11. The method of producing a composite negative for cinematography which comprises forming a projection film on a background involving moving elements, projecting a frame of said film on a screen, applying a transparent sheet to a screen, manually producing a mark on the transparent sheet capable of being photographed, photographing by reflected light the mark on all of the raw stock frames of the negative, projecting on the screen the frames of the projection film which corresponds to the position of the moving object as represented by the mark, photographing the frames in succession on the corresponding number of raw stock frames, projecting the other frames of the projection film on the screen, applying one or more marks on the transparent sheet to designate the continuing path of the moving elements and photographing the marks as applied in succession by a transmitted light while photographing the background corresponding to the continuing path of the elements by transmitted light on the raw stock frames of the negative, the manually produced marks on the transparency serving as masks for the previously photographed path when the backgrounds are being photographed by transmitted light.

MAX FLEISCHER.